(12) United States Patent
Chu

(10) Patent No.: US 12,683,257 B2
(45) Date of Patent: Jul. 14, 2026

(54) ELECTROCHEMICAL BATTERY CELL INCLUDING A CONDUCTIVE LAYER AND METHOD OF MAKING THE SAME

(71) Applicant: GM GLOBAL TECHNOLOGY OPERATIONS LLC, Detroit, MI (US)

(72) Inventor: Seung-Woo Chu, Clawson, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 577 days.

(21) Appl. No.: 18/334,686

(22) Filed: Jun. 14, 2023

(65) Prior Publication Data

US 2024/0421456 A1    Dec. 19, 2024

(51) Int. Cl.
| | |
|---|---|
| *H01M 50/636* | (2021.01) |
| *H01M 10/0565* | (2010.01) |
| *H01M 10/0569* | (2010.01) |
| *H01M 10/615* | (2014.01) |
| *H01M 50/152* | (2021.01) |
| *H01M 50/166* | (2021.01) |

(52) U.S. Cl.
CPC ..... *H01M 50/636* (2021.01); *H01M 10/0565* (2013.01); *H01M 10/0569* (2013.01); *H01M 10/615* (2015.04); *H01M 50/152* (2021.01); *H01M 50/166* (2021.01)

(58) Field of Classification Search
None
See application file for complete search history.

(56) References Cited

U.S. PATENT DOCUMENTS

| | | | | |
|---|---|---|---|---|
| 2011/0223461 A1* | 9/2011 | Kim | ............... | H01M 50/105 |
| | | | | 429/163 |
| 2021/0313644 A1* | 10/2021 | Jin | ............... | H01M 50/233 |
| 2021/0384566 A1* | 12/2021 | Jung | ............... | H01M 10/04 |
| 2022/0037710 A1* | 2/2022 | Yoon | ............... | H01M 10/625 |
| 2022/0158284 A1* | 5/2022 | Lee | ............... | H01M 50/271 |
| 2022/0285792 A1* | 9/2022 | Jung | ............... | H01M 50/507 |
| 2023/0307740 A1* | 9/2023 | Bu | ............... | H01M 50/55 |

* cited by examiner

*Primary Examiner* — Scott J. Chmielecki
(74) *Attorney, Agent, or Firm* — Quinn IP Law

(57) ABSTRACT

A method for making a battery cell includes: disposing an electrode assembly within a battery can; assembling a top cap assembly to the battery can to form a battery cell having at least a first filling hole and a second filling hole; disposing a first portion of a liquid solution within the battery cell via the first filling hole, the liquid solution including an organic solvent, a cross-linkable polymer and a cross-linking agent; converting the first portion of the liquid solution into a first conductive layer disposed between the electrode assembly and the battery can; disposing a second portion of the liquid solution within the battery cell via the second filling hole; converting the second portion of the liquid solution into a second conductive layer disposed between the electrode assembly and the battery can; and filling the battery cell with a liquid electrolyte via an electrolyte filling hole.

19 Claims, 5 Drawing Sheets

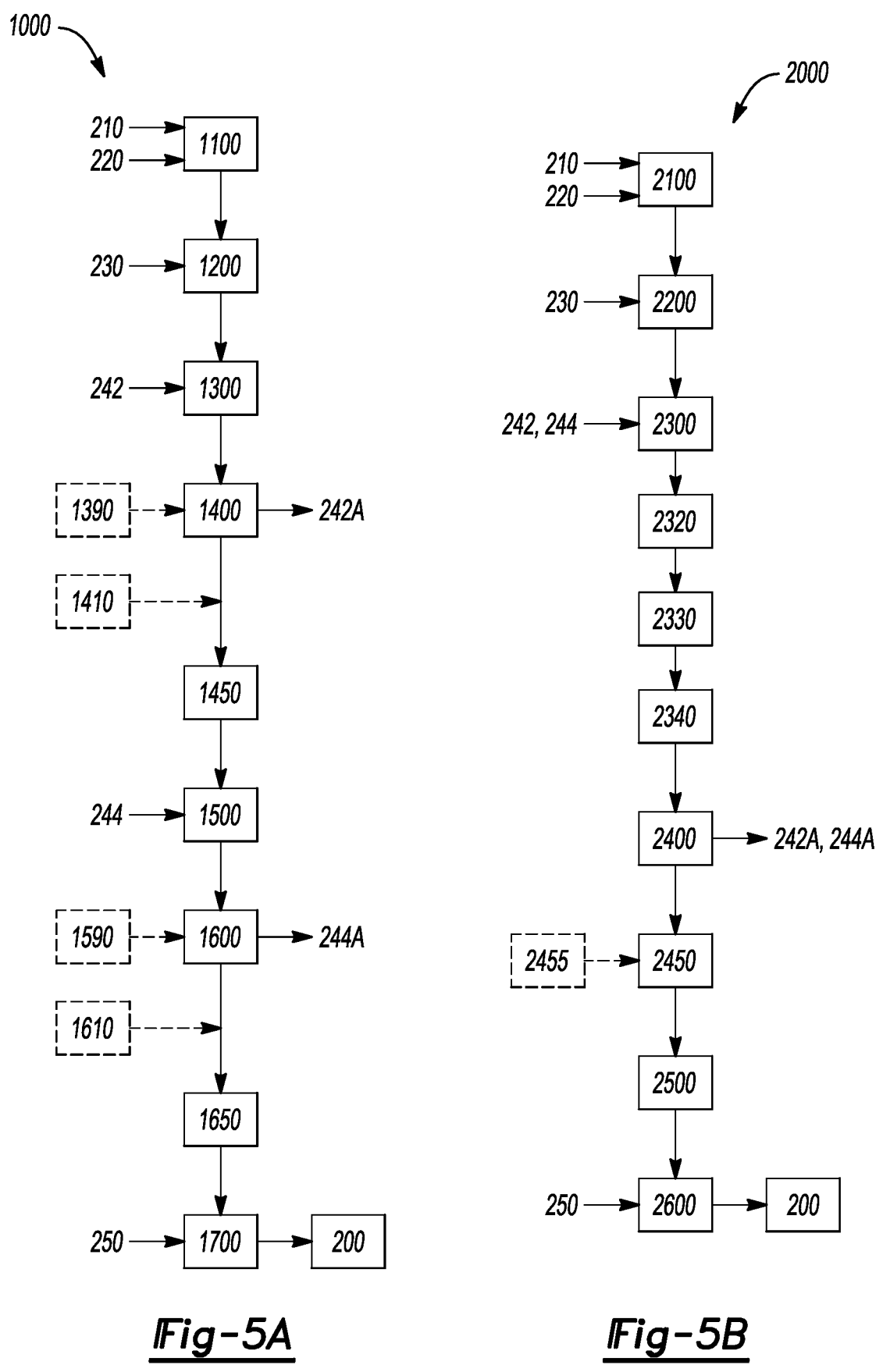
*Fig-5A*          *Fig-5B*

ELECTROCHEMICAL BATTERY CELL INCLUDING A CONDUCTIVE LAYER AND METHOD OF MAKING THE SAME

INTRODUCTION

The concepts described herein relate generally to electrochemical battery cells including, but not limited to, prismatic battery cells and cylindrical battery cells having metallic enclosures or "cans" and that include heat dissipation pathways for effective and consistent heat dissipation over a life of the battery cell.

A lithium-ion battery is an electrochemical device that operates by passing lithium ions between a negative electrode (or anode) and a positive electrode (or cathode). Generally, in most prismatic battery cells, the negative and positive electrodes are situated on opposite sides of a porous polymer separator to form an electrode stack. The electrode stack may be part of an electrode assembly, and may include a protective wrap. The electrode stack or assembly is disposed within a hollow, rectangular, metallic battery enclosure or "can," and soaked or "wetted" with an electrolyte solution suitable for conducting lithium ions.

In most cylindrical battery cells, a jelly roll (JR) design is used. Generally, in the JR design, an insulating base is laid down, followed by the anode layer, the separator layer, and the cathode layer to form an electrode stack. The electrode stack is then rolled up into a cylinder and inserted into a hollow, metallic, cylindrical casing or battery can, and soaked or "wetted" with an electrolyte solution suitable for conducting lithium ions.

DC power sources, such as lithium-ion batteries, may be employed to store and release electric power that may be employed by an electric circuit or an electric machine to perform work, such as for communications, display, or propulsion. Heat may be generated by the processes of converting electric power to chemical potential energy, i.e., battery charging, and converting chemical potential energy to electric power, i.e., battery discharging.

Lithium-ion battery cells, for example but not limited to lithium-ion battery cells used in a rechargeable energy storage system (RESS), are generally packaged into battery modules or battery packs. Each lithium-ion battery module or battery pack may include multiple lithium-ion battery cells. Accordingly, each lithium-ion module or battery pack may generate an even greater amount of heat than an individual lithium-ion battery cell.

The individual lithium-ion battery cells, including, but not limited to, prismatic battery cells and cylindrical battery cells, may include a void space, between a side wall of a metallic battery can and an electrode assembly contained within the metallic battery can. The void space may include air, which may reduce thermal performance within the individual battery cell.

Current cooling or heat-dissipation strategies for lithium-ion battery modules or battery packs may include cooling plates disposed within a lithium-ion battery module or battery pack, for example but not limited to, between the lithium-ion battery cells, as a unit, and the battery module or battery pack and/or between the individual lithium-ion battery cells within the battery module or battery pack. These cooling or heat-dissipation strategies are external to the lithium-ion battery cell unit within the battery module or battery pack, and/or external to the individual lithium-ion battery cell itself.

SUMMARY

In view of the above discussion, it is useful to develop a battery cell having improved thermal performance within the battery cell. A heat dissipation pathway may be provided herein by including a conductive layer, internal to the battery cell, disposed between an electrode assembly and a battery can. The conductive layer may be more effective than current cooling or heat-dissipation strategies, for example, but not limited to, those currently used in battery cells used in rechargeable energy storage systems (RESS), without compromising existing thermal runaway characteristics.

An electrochemical battery cell may include an electrode assembly, a battery can, and a top cap assembly. The battery can may include a first side wall and a second side wall.

The electrode assembly may be disposed within the battery can. The top cap assembly may be assembled to the battery can to form a battery cell having a first filling hole and a second filling hole.

A first portion of the liquid solution may be disposed within the battery cell via the first filling hole. The first portion of the liquid solution may be converted into a first conductive layer disposed between a first side wall of the battery can and the electrode assembly.

A second portion of the liquid solution may be disposed within the battery cell via the second filling hole. The second portion of the liquid solution may be converted into a second conductive layer disposed between a second side wall of the battery can and the electrode assembly.

The liquid solution may include an organic solvent, a cross-linkable polymer and a cross-linking agent.

Vacuum filling may be used to facilitate the liquid electrolyte being introduced into the battery cell.

Each of the first portion and the second portion of the liquid solution may be converted, respectively, into the first conductive layer and the second conductive layer by reacting the cross-linkable polymer and the cross-linking agent of each of the first portion and the second portion of the liquid solution to form a reaction product, such that the organic solvent may be contained within the reaction product.

Reacting the cross-linkable polymer and the cross-linking agent of each of the first portion and the second portion of the liquid solution may include applying heat to the liquid solution.

The first portion of the liquid solution disposed within the battery cell may be converted into the first conductive layer by applying heat to at least the first side wall of the battery can when the battery cell is in a first position.

The second portion of the liquid solution disposed within the battery cell may be converted into the second conductive layer by applying heat to at least the second side wall of the battery can when the battery cell is in a second position.

The first conductive layer may be in contact with the first side wall of the battery can and a first side portion of the electrode assembly. The second conductive layer may be in contact with the second side wall of the battery can and a second side portion of the electrode assembly.

According to one aspect of the present disclosure, at least one of the first filling hole and the second filling hole may be disposed in the top cap assembly.

According to another aspect of the present disclosure, the at least one of the first filling hole and the second filling hole may be disposed in the battery can.

The battery can may be pre-warmed prior to disposing at least one of the first portion and the second portion of the liquid solution within the battery cell.

According to another aspect of the present disclosure, vacuum filling may be used to facilitate the liquid electrolyte being disposed within the battery cell.

The liquid solution may include an alkyl phosphate mixed solution.

A method for making a battery cell, according to one aspect of the present disclosure, may include: disposing an electrode assembly within a battery can; assembling a top cap assembly to the battery can to form a battery cell having at least a first filling hole and a second filling hole; disposing a first portion of a liquid solution within the battery cell via the first filling hole, the liquid solution including an organic solvent, a cross-linkable polymer and a cross-linking agent; converting the first portion of the liquid solution into a first conductive layer disposed between the electrode assembly and the battery can; disposing a second portion of the liquid solution within the battery cell via the second filling hole; converting the second portion of the liquid solution into a second conductive layer disposed between the electrode assembly and the battery can; and filling the battery cell with a liquid electrolyte via an electrolyte filling hole.

Converting at least one of the first portion and/or the second portion of the liquid solution, respectively, into at least one of the first and/or second conductive layer may include: reacting the cross-linkable polymer and the cross-linking agent of at least one of the first and/or second portion of the liquid solution to form a reaction product, such that the organic solvent is contained within the reaction product.

Reacting the cross-linkable polymer and the cross-linking agent of each of the first portion and the second portion of the liquid solution may include applying heat to the liquid solution.

The battery cell may be in a first position when the first portion of the liquid solution is converted into the first conductive layer. The battery cell may be rotated into a second position prior to converting the second portion of the liquid solution into the second conductive layer. An angle between the first position and the second position may be 180 degrees.

Converting the first portion of the liquid solution into the first conductive layer may include applying heat to at least a first side wall of the battery can, while converting the second portion of the liquid solution into the second conductive layer may include applying heat to at least a second side wall of the battery can.

The first conductive layer may be in contact with the first side wall of the battery can and a first side portion of the electrode assembly, while the second conductive layer may be in contact with the second side wall of the battery can and a second side portion of the electrode assembly.

According to one aspect of the present disclosure, at least one of the first filling hole and the second filing hole may be disposed in the top cap assembly.

According to another aspect of the present disclosure, at least one of the first filling hole and the second filling hole may be disposed in the battery can.

The battery can may be pre-warmed prior to disposing at least one of the first portion and/or second portion of liquid solution within the battery cell.

According to another aspect of the present disclosure, filling the battery cell with the electrolyte includes vacuum filling.

A method for making a battery cell, according to one aspect of the present disclosure, may include: disposing an electrode assembly within a battery can; assembling a top cap assembly to the battery can to form a battery cell having two filling holes; disposing a liquid solution within the battery cell via at least one of the two filling holes, the liquid solution including an organic solvent, a cross-linkable polymer and a cross-linking agent; converting the liquid solution into at least one conductive layer disposed between at least one side portion of the electrode assembly and the battery can, wherein converting the liquid solution into the at least one conductive layer includes reacting the cross-linkable polymer and the cross-linking agent of the liquid solution to form a reaction product, wherein the organic solvent is contained within the reaction product; filling the battery cell with a liquid electrolyte using vacuum filling.

Disposing the liquid solution within the battery cell may include disposing a first portion of the liquid solution within the battery cell via one of the two filling holes, and disposing a second portion of the liquid solution within the battery cell via another of the two filling holes.

The method may include rotating the battery cell from a first position to a second position before disposing the second portion of the liquid solution within the battery cell.

The method may include storing the battery cell for a pre-defined period of time in the first position before rotating the battery cell to the second position.

According to one aspect of the present disclosure, the at least one conductive layer may include two conductive layers. The first portion of the liquid solution may be converted into one of the two conductive layers when the battery cell is in the first position and the second portion of the liquid solution may be converted to another of the two conductive layers when the battery cell is in the second position.

One of the two conductive layers may be disposed between the battery can and one side portion of the electrode assembly, and another of the two conductive layers may be disposed between the battery can and another side portion of the electrode assembly.

One of the two conductive layers may be in contact with the battery can and one side portion the electrode assembly, and another of the two conductive layers may be in contact with the battery can and another side portion of the electrode assembly.

According to one aspect of the present disclosure, reacting the cross-linkable polymer and the cross-linking agent of the liquid solution to form the reaction product include applying heat to the battery can.

According to another aspect of the present disclosure, the method may include pre-warming the battery can prior to disposing the liquid solution within the battery cell.

Therefore, by including a conductive layer, internal to the battery cell, disposed between an electrode assembly and a battery can, a heat dissipation pathway may be provided. The conductive layer may be more effective than current cooling or heat-dissipation strategies, for example, but not limited to, those currently used in battery cells used in a rechargeable energy storage system (RESS), without compromising existing thermal runaway characteristics.

The above features and advantages, and other features and attendant advantages of this disclosure, will be readily apparent from the following detailed description of illustrative examples and modes for carrying out the present disclosure when taken in connection with the accompanying drawings and the appended claims. Moreover, this disclosure expressly includes combinations and sub-combinations of the elements and features presented above and below.

BRIEF DESCRIPTION OF THE DRAWINGS

The accompanying drawings, which are incorporated into and constitute a part of this specification, illustrate implementations of the disclosure which, taken together with the description, serve to explain the principles of the disclosure.

FIG. 5A is a flow chart describing a method for making a battery cell in accordance with the present disclosure.

FIG. 5B is a flow chart describing a method for making a battery cell in accordance with the present disclosure.

Figure 1:
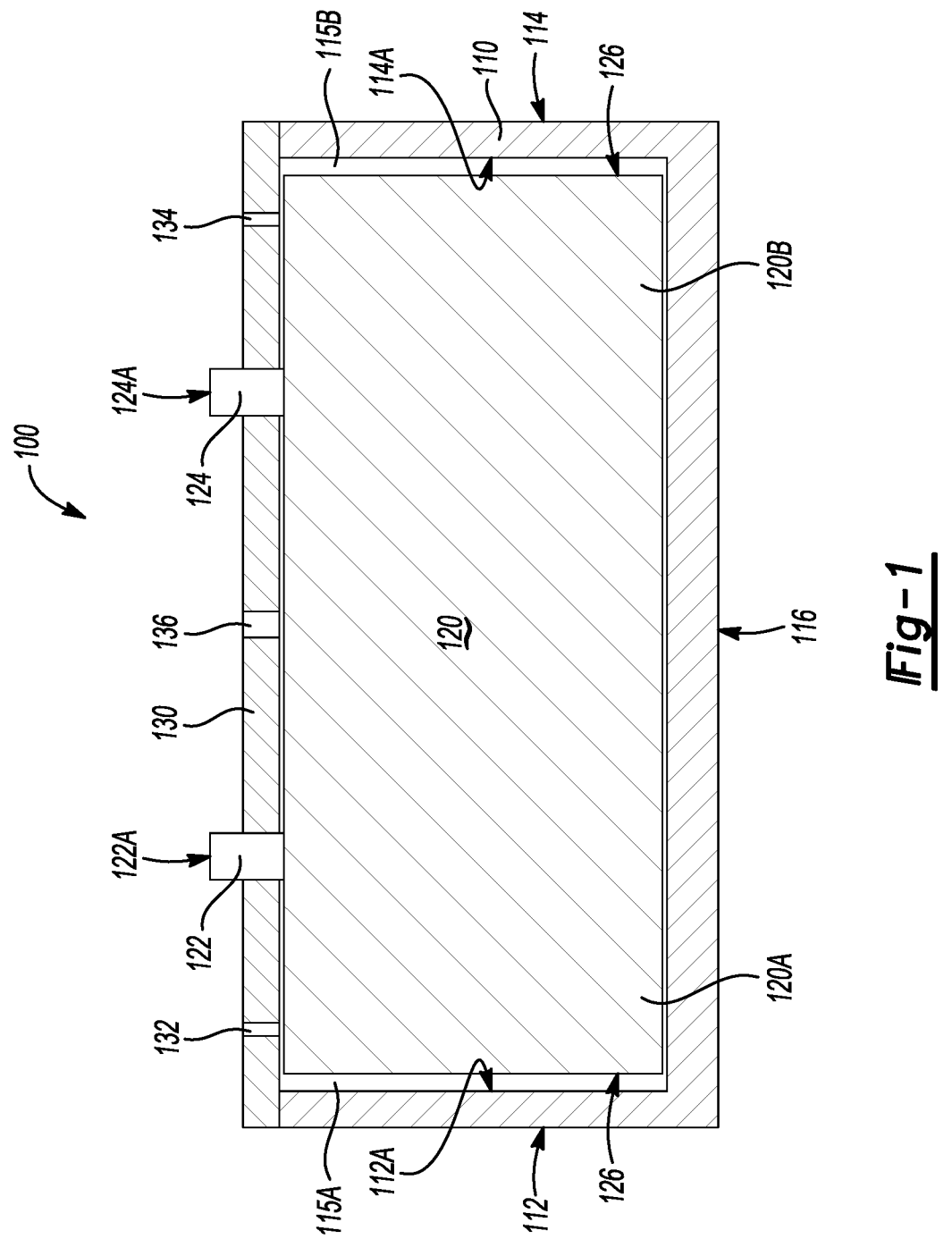
FIG. 1 is a schematic illustration of a cross-section of an example battery cell, in an upright position, without liquid solution.

The appended drawings are not necessarily to scale, and may present a somewhat simplified representation of various preferred features of the present disclosure as disclosed herein, including, for example, specific dimensions, orientations, locations, and shapes. Details associated with such features will be determined in part by the particular intended application and use environment.

DETAILED DESCRIPTION

The present disclosure is susceptible of embodiment in many different forms. Representative examples of the disclosure are shown in the drawings and described herein in detail as non-limiting examples of the disclosed principles. To that end, elements and limitations described in the Abstract, Introduction, Summary, and Detailed Description sections, but not explicitly set forth in the claims, should not be incorporated into the claims, singly or collectively, by implication, inference, or otherwise.

For purposes of the present description, unless specifically disclaimed, use of the singular includes the plural and vice versa, the terms "and" and "or" shall be both conjunctive and disjunctive, and the words "including," "containing," "comprising," "having," and the like shall mean "including without limitation." Moreover, words of approximation such as "about," "almost," "substantially," "generally," "approximately," etc., may be used herein in the sense of "at, near, or nearly at," or "within 0-5% of," or "within acceptable manufacturing tolerances," or logical combinations thereof.

Referring now to the drawings, wherein like numerals indicate like parts in several views, a battery cell, including a liquid solution converted to a conductive layer, and methods for making a battery cell, including a liquid solution converted into a conductive layer, are shown and described herein.

As generally illustrated in FIG. 1, an electrochemical battery cell 100 is shown in an upright position. The battery cell 100 generally includes a battery can 110, an electrode assembly 120, and a top cap assembly 130. The battery can 110 includes a first side wall 112, a second side wall 114, and a bottom 116.

The battery can 110 includes a metallic material, for example but not limited to aluminum.

The electrode assembly 120 includes electrode tabs 122 and 124, each of which extends through the top cap assembly 130 to terminals 122A and 124A. The electrode tab 122 extends upward from a first side portion 120A of the electrode assembly 120. The electrode tab 124 extends upward from a second side portion 120B of the electrode assembly 120.

The top cap assembly 130 includes a first filling hole 132, a second filling hole 134 and an electrolyte filling hole 136.

The electrode assembly 120 is disposed within the battery can 110.

Air gaps 115A and 115B are formed, respectively, between the first side portion 120A of the electrode assembly 120 and an inner surface 112A of the first side wall 112 of the battery can 110, and the second side portion 120B of the electrode assembly 120 and an inner surface 114A of the second side wall 114 of the battery can 110.

The top cap assembly 130 is assembled to the battery can 110 to form the battery cell 100.

Figures 2A, 2B:
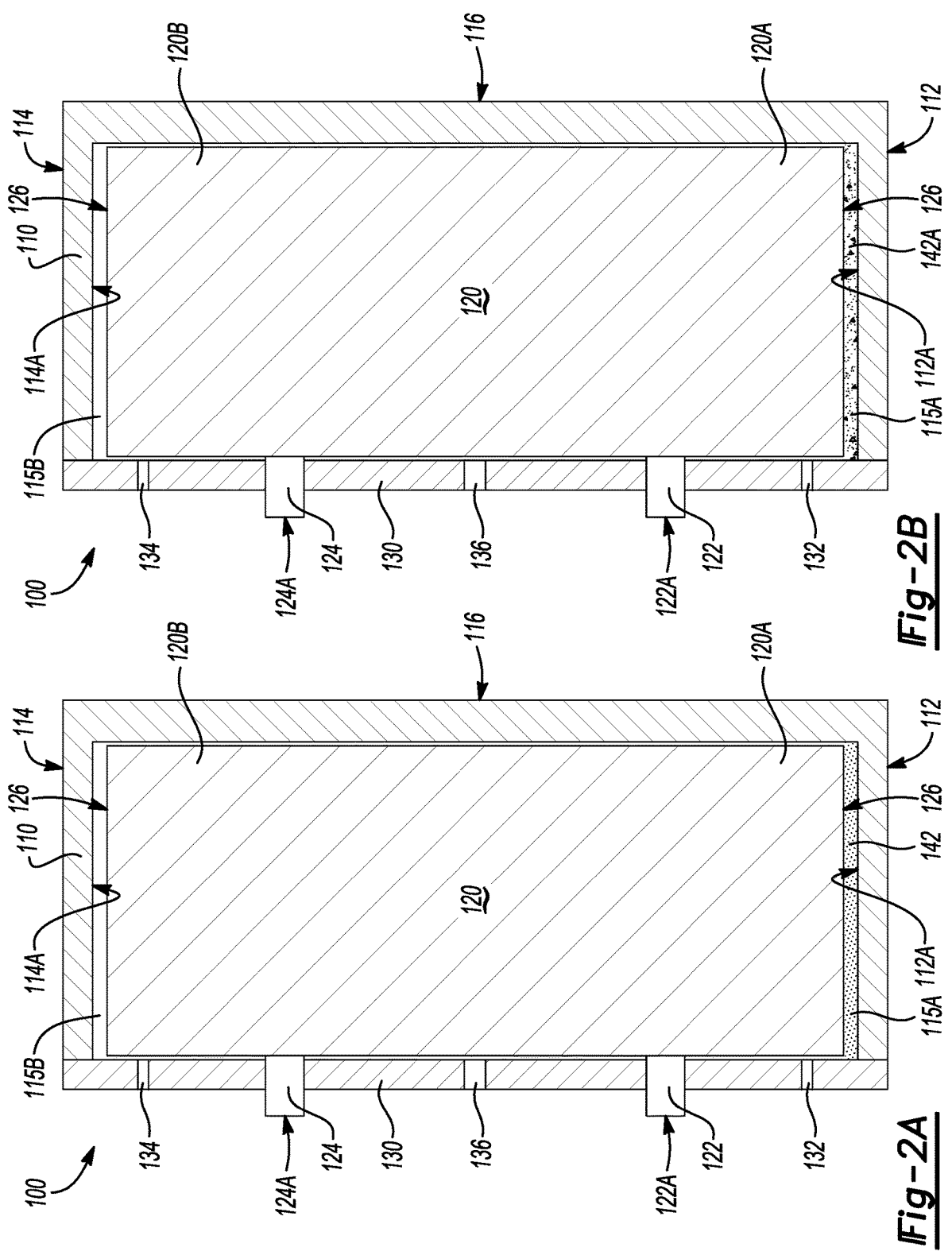
FIG. 2A is a schematic illustration of a cross-section of an example battery cell constructed in accordance with the present disclosure, rotated to Position 1, before liquid solution conversion.
FIG. 2B is a schematic illustration of a cross-section of an example battery cell constructed in accordance with the present disclosure, rotated to Position 1, after liquid solution conversion to conductive layer.

As illustrated in FIGS. 2A and 2B, with continued reference to FIG. 1, a battery cell 100 is shown in a first position P1.

In the first position P1, a battery cell 100 is rotated 90 degrees counter-clockwise from the upright position illustrated in FIG. 1, such that the first side wall 112 of the battery cell 100 is horizontal.

A first portion 142 of a liquid solution is disposed within the battery cell 100 via the first filling hole 132 disposed in the top cap assembly 130, as illustrated in FIG. 2A.

The first portion 142 of the liquid solution is converted into a first conductive layer 142A disposed between a first side wall 112 of the battery can 110 and a first side portion 120A of the electrode assembly 120, as illustrated in FIG. 2B.

The first conductive layer 142A is in contact with an inner surface 112A of the first side wall 112 of the battery can 110 and the first side portion 120A of the electrode assembly 120, filling the air gap 115A between the inner surface 112A of the first side wall 112 of the battery can 110 and the first side portion 120A of the electrode assembly 120.

As illustrated in 3A and 3B, with continued reference to FIG. 1, a battery cell 100 is shown in a second position P2.

In the second position P2, the battery cell 100 is rotated 180 degrees clockwise from the first position P1 illustrated in FIGS. 2A and 2B, or 90 degrees clockwise from the upright position illustrated in FIG. 1, such that the second side wall 114 is horizontal.

Figures 3A, 3B:
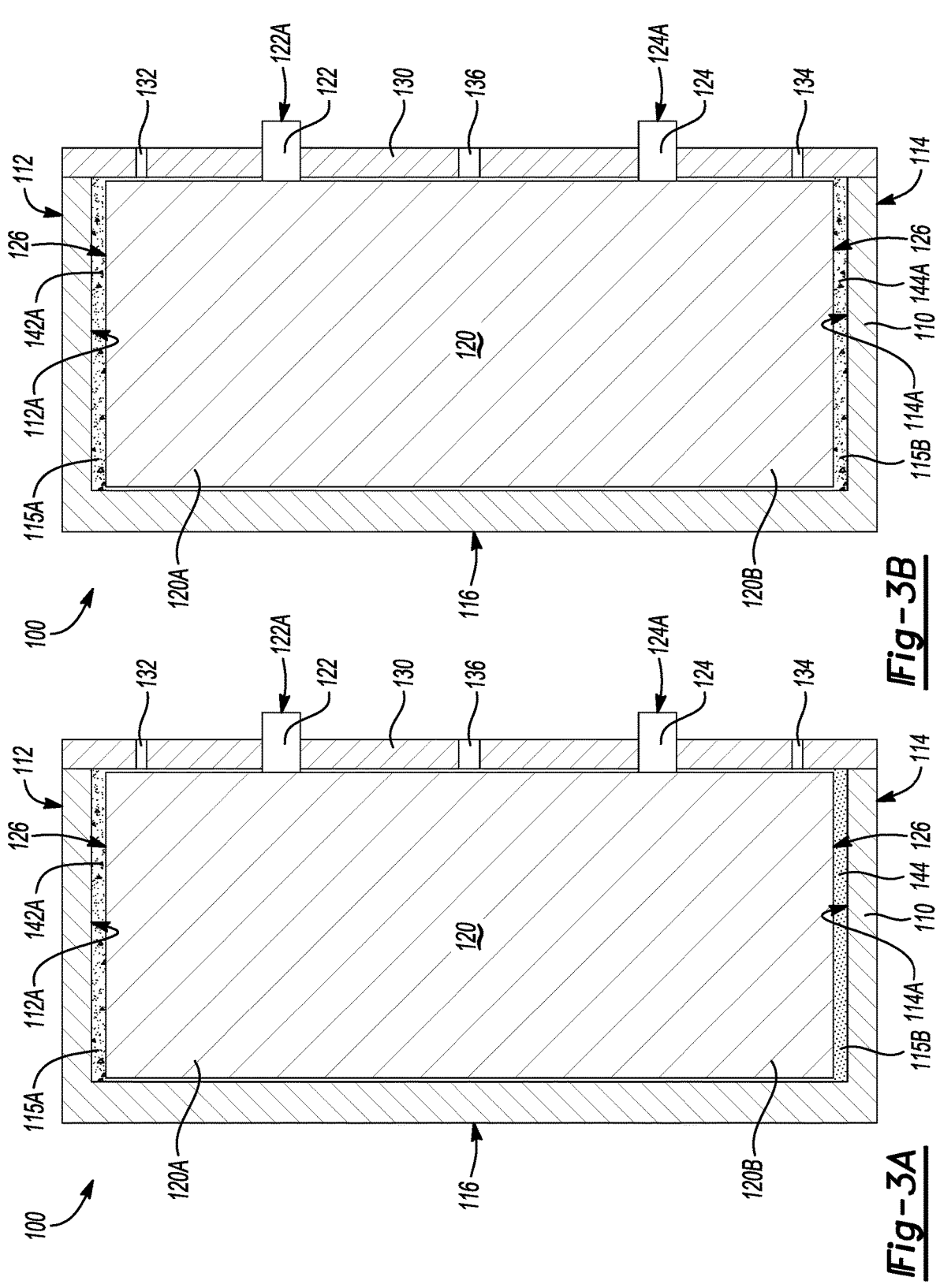
FIG. 3A is a schematic illustration of a cross-section of an example battery cell constructed in accordance with the present disclosure, rotated to Position 2, before liquid solution conversion.
FIG. 3B is a schematic illustration of a cross-section of an example battery cell constructed in accordance with the present disclosure, rotated to Position 2, after liquid solution conversion to conductive layer.
Figure 4:
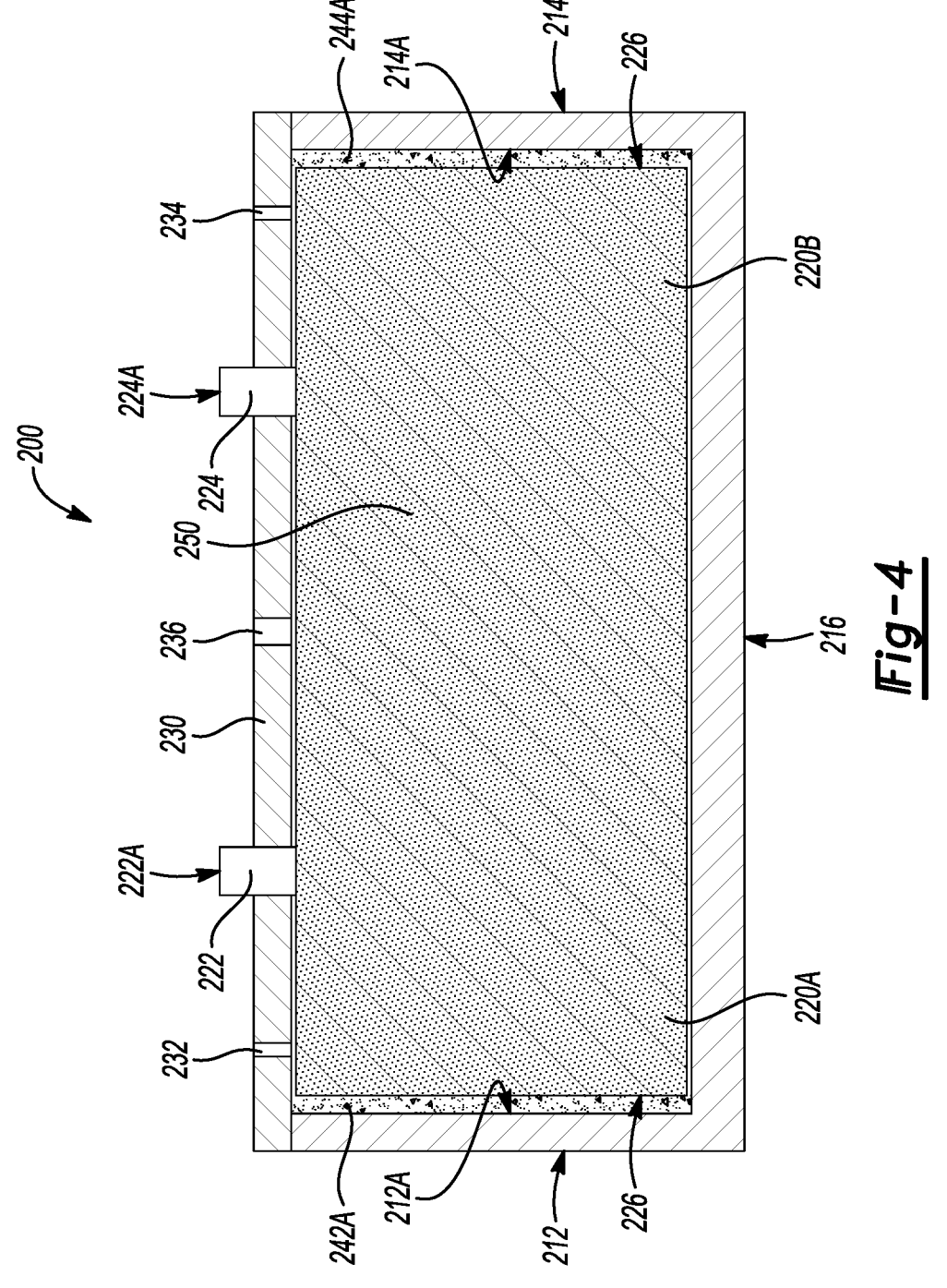
FIG. 4 is a schematic illustration of a cross-section of an example battery cell constructed in accordance with the present disclosure, in an upright position, including conductive layers and liquid electrolyte solution.

A second portion 144 of the liquid solution is disposed within the battery cell 100 via the second filling hole 134 disposed in the top cap assembly 130, as illustrated in FIG. 3A.

The second portion 144 of the liquid solution is converted into a second conductive layer 144A disposed between a second side wall 114 of the battery can 110 and the second side portion 120B of the electrode assembly 120, as illustrated in FIG. 3B.

The second conductive layer 144A is in contact with an inner surface 114A of the second side wall 114 of the battery can 110 and the second side portion 120B of the electrode assembly 120, filling the air gap 115B between the inner surface 114A of the second side wall 114 of the battery can 110 and the second side portion 120B of the electrode assembly 120.

The liquid solution includes an organic solvent, a cross-linkable polymer, and a cross-linking agent, in which one non-limiting example may include an alkyl phosphate mixed solution with a carbonate or ester based organic solvent, such that the content of the alkyl phosphate mixed solution is between 5 wt % and 100 wt %, a cross-linkable oligomer (or monomer), and a cross-linking agent, that is activated by an increase in temperature.

Each of the first portion 142 and the second portion 144 of the liquid solution, illustrated in FIGS. 2A and 3A, is converted, respectively, into the first conductive layer 142A and the second conductive layer 144A, illustrated in FIGS. 2B and 3B, by reacting the cross-linkable polymer and the cross-linking agent of each of the first portion 142 and the second portion 144 of the liquid solution to form a reaction product, such that the organic solvent is contained within the reaction product.

The first portion 142 of the liquid solution is converted into the first conductive layer 142A by applying heat to at least the first side wall 112 of the battery can 110.

A shape of the first conductive layer 142A is defined by the inner surface 112A of the first side wall 112 of the battery can 110 and an outer surface 126 of the electrode assembly 120.

A dimension of the first conductive layer 142A is defined by a pre-determined amount of liquid solution included in the first portion 142.

The second portion 144 of the liquid solution is converted into the second conductive layer 144A by applying heat to at least the second side wall 114 of the battery can 110.

A shape of the second conductive layer 144A is defined by the inner surface 114A of the second side wall 114 of the battery can 110 and the outer surface 126 of the electrode assembly 120.

A dimension of the second conductive layer 144A is defined by a pre-determined amount of liquid solution included in the second portion 144.

Each of the first conductive layer 142A and the second conductive layer 144A, illustrated in FIGS. 2B and 3B, includes a gel that is not free-flowing after completion of the cross-linking process at zero shear force.

As each of the first conductive layer 142A and the second conductive layer 144A, illustrated in FIGS. 2B and 3B, fills the air gaps 115A, 115B, illustrated in FIG. 1, with, for example but not limited to, an alkyl phosphate in a gel form, thermal performance is improved by increasing heat conductivity between the electrode assembly 120 and the battery can 110.

While the first filling hole 132 and the second filling hole 134 are illustrated as being disposed in the top cap assembly 130, it should be appreciated that at least one or both of the first filling hole 132 and the second filling hole 134 may be disposed in the battery can 110.

According to one aspect of the present disclosure, the battery can 110 may be pre-warmed prior to disposing at least one of the first portion 142 and the second portion 144 of the liquid solution within the battery cell 100.

As illustrated in FIG. 5A, an electrochemical battery cell 200, in accordance with the present disclosure, is shown in an upright position. The battery cell 200 generally includes a battery can 210, an electrode assembly 220, and a top cap assembly 230. The battery can 210 includes a first side wall 212, a second side wall 214 and a bottom 216.

The battery can 210 includes a metallic material, for example but not limited to aluminum.

The electrode assembly 220 includes electrode tabs 222 and 224, each of which extends through the top cap assembly 230 to terminals 222A and 224A. The electrode tab 222 extends upward from a first side portion 220A of the electrode assembly 220. The electrode tab 224 extends upward from a second side portion 220B of the electrode assembly 220.

The top cap assembly 230 includes a first filling hole 232, a second filling hole 234 and an electrolyte filling hole 236.

The electrode assembly 220 is disposed within the battery can 210.

A first conductive layer 242A is disposed between the first side wall 212 of the battery can 210 and the first side portion 220A of the electrode assembly 220, filling the air gap 115A (FIG. 1).

The first conductive layer 242A is in contact with an inner surface 212A of the first side wall 212 of the battery can 210 and the first side portion 220A of the electrode assembly 220.

A second conductive layer 244A is disposed the second side wall 214 of the battery can 210 and the second side portion 220B of the electrode assembly 220, filling the air gap 115B (FIG. 1).

The second conductive layer 244A is disposed between an inner surface 214A of the second side wall 214 of the battery can 210 and the second side portion 220B of the electrode assembly 220.

The top cap assembly 230, including the first filling hole 232 and the second filling hole 234, is assembled to the battery can 210 to form the battery cell 200.

A liquid electrolyte 250 is disposed within the battery cell 200.

As illustrated in FIG. 5A, a method 1000 for making a battery cell 200 includes: disposing 1100 an electrode assembly 220 within a battery can 210; assembling 1200 a top cap assembly 230 to the battery can 210 to form a battery cell 200 having at least a first filling hole 232 and a second filling hole 234; disposing 1300 a first portion 242 of a liquid solution within the battery cell 200 via the first filling hole 232, the liquid solution including an organic solvent, a cross-linkable polymer and a cross-linking agent; converting 1400 the first portion 242 of the liquid solution into a first conductive layer 242A disposed between the electrode assembly 220 and the battery can 210; disposing 1500 a second portion 244 of the liquid solution within the battery cell 200 via the second filling hole 234; converting 1600 the second portion 244 of the liquid solution into a second conductive layer 244A disposed between the electrode assembly 220 and the battery can 210; and filling 1700 the battery cell 200 with a liquid electrolyte 250 within the battery cell 200 via an electrolyte filling hole 236.

Converting 1400, 1600 at least one of the first portion 242 and/or the second portion 244 of the liquid solution, respectively, into at least one of the first conductive layer 242A and/or second conductive layer 244A may include: reacting 1450, 1650 the cross-linkable polymer and the cross-linking agent of at least one of the first portion 242 and/or second portion 244 of the liquid solution to form a reaction product, such that the organic solvent is contained within the reaction product.

The battery cell 100 is in a first position P1 when the first portion 242 of the liquid solution is converted 1400 into the first conductive layer 242A. The battery cell 200 is rotated 180 degrees into a second position P2 prior to converting 1600 the second portion 244 of the liquid solution into the second conductive layer 244A.

According to one aspect of the present disclosure, converting 1400 the first portion 142 of the liquid solution into the first conductive layer 242A includes applying heat 1390 to at least a first side wall 212 of the battery can 210, while converting the second portion 244 of the liquid solution into the second conductive layer 244A may include applying heat 1590 to at least a second side wall 214 of the battery can 210.

The first conductive layer 242A is in contact with the first side wall 212 of the battery can 210 and a first side portion 220A of the electrode assembly 220, while the second conductive layer 244A is in contact with the second side wall 214 of the battery can 210 and a second side portion 220B of the electrode assembly 220.

Converting 1400 the first portion 242 of the liquid solution into a first conductive layer 242A, may include storing 1410 the battery cell 200 at a pre-defined temperature for a pre-determined period of time.

Converting 1600 the second portion 244 of the liquid solution into a second conductive layer 244A, may include storing 1610 the battery cell 200 at a pre-defined temperature for a pre-determined period of time.

In one example according to the present disclosure, at least one of the first filling hole 232 and the second filing hole 234 may be disposed in the top cap assembly 230.

In another example according to the present disclosure, at least one of the first filling hole 232 and the second filling hole 234 may be disposed in the battery can 210.

The battery can 210 may be pre-warmed prior to disposing at least one of the first portion 242 and/or second portion 244 of liquid solution within the battery cell 200.

According to one aspect of the present disclosure, filling 1700 the battery cell 200 with a liquid electrolyte 250 includes using vacuum filling.

As illustrated in FIG. 5B, a method 2000 for making a battery cell 200 may include: disposing 2100 an electrode assembly 220 within a battery can 210; assembling 2200 a top cap assembly 230 to the battery can 210 to form a battery cell 200 having two filling holes 232, 234; disposing 2300 a liquid solution 242, 244 within the battery cell 200 via at least one of the two filling holes 232, 234, the liquid solution 242, 244 including an organic solvent, a cross-linkable polymer and a cross-linking agent; converting 2400 the liquid solution 242, 244 into at least one conductive layer 242A, 244A disposed between at least one side portion 220A, 220B of the electrode assembly 220 and the battery can 210; and filling 200 the battery cell 200 with a liquid electrolyte 250 using vacuum filing.

Converting 2400 the liquid solution 242, 244 into the at least one conductive layer 242A, 244A includes reacting 2450 the cross-linkable polymer and the cross-linking agent of the liquid solution 242, 244 to form a reaction product, wherein the organic solvent is contained within the reaction product.

Disposing 2300 the liquid solution 240 within the battery cell 200 includes disposing a first portion 242 of the liquid solution within the battery cell 200 via one of the two filling holes 232, 234, and disposing a second portion 244 of the liquid solution within the battery cell 200 via another of the two filling holes 232, 234.

The method 2000 further includes rotating 2330 the battery cell 200 from a first position P1 to a second position P2 before disposing 2340 the second portion 244 of the liquid solution within the battery cell 200.

The method 2000 may include storing 2320 the battery cell 200 for a pre-defined period of time in the first position P1 before rotating 2330 the battery cell 200 to the second position P2.

According to one aspect of the present disclosure, at least one conductive layer 242A, 244A may include two conductive layers 242A and 244A. The first portion 242 of the liquid solution is converted into one of the two conductive layers 242A, 244A when the battery cell 200 is in the first position P1, and the second portion 244 of the liquid solution is converted to another of the two conductive layers 242A, 244A when the battery cell 200 is in the second position P2.

One of the two conductive layers 242A, 244A is disposed between the battery can 210 and one side portion 220A, 220B of the electrode assembly 220, and another of the two conductive layers 242A, 244A is disposed between the battery can 210 and another side portion 220A, 220B of the electrode assembly 220.

One of the two conductive layers 242A, 244A is in contact with the battery can 210 and one side portion 220A, 220B of the electrode assembly 220, and another of the two conductive layers 242A, 244A is in contact with the battery can 210 and another side portion 220A, 220B of the electrode assembly 220.

According to one aspect of the present disclosure, reacting 2450 the cross-linkable polymer and the cross-linking agent of the liquid solution 242, 244 to form the reaction product includes applying heat 2455 to the battery can 210.

By including at least one conductive layer disposed between an electrode assembly and a battery can of a battery cell, a heat dissipation pathway is provided within the battery cell that is more effective than an air gap disposed between the electrode assembly the battery can, and/or other cooling strategies currently employed to dissipate heat without compromising existing thermal runaway characteristics.

These and other attendant benefits of the present disclosure will be appreciated by those skilled in the art in view of the foregoing disclosure.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

What is claimed is:

1. A method for making a battery cell comprising:

disposing an electrode assembly within a battery can;

assembling a top cap assembly to the battery can to form the battery cell having at least a first filling hole and a second filling hole;

disposing a first portion of a liquid solution within the battery cell via the first filling hole, the liquid solution including an organic solvent, a cross-linkable polymer and a cross-linking agent;

converting the first portion of the liquid solution into a first conductive layer disposed between the electrode assembly and the battery can;

disposing a second portion of the liquid solution within the battery cell via the second filling hole;

converting the second portion of the liquid solution into a second conductive layer disposed between the electrode assembly and the battery can; and filling the battery cell with a liquid electrolyte via an electrolyte filling hole.

2. The method of making a battery cell as recited in claim 1, wherein converting at least one of the first portion and/or the second portion of the liquid solution, respectively, into at least one of the first and/or second conductive layer includes reacting the cross-linkable polymer and the cross-linking agent of at least one of the first and/or second portion of the liquid solution to form a reaction product, wherein the organic solvent is contained within the reaction product.

3. The method of making a battery cell as recited in claim 1, wherein the battery cell is in a first position when the first portion of the liquid solution is converted into the first conductive layer, and further including: rotating the battery cell into a second position prior to converting the second portion of the liquid solution into the second conductive layer.

4. The method of making a battery cell as recited in claim 1, wherein converting the first portion of the liquid solution into the first conductive layer includes applying heat to at least a first side wall of the battery can; and wherein converting the second portion of the liquid solution into the second conductive layer includes applying heat to at least a second side wall of the battery can.

5. The method of making a battery cell as recited in claim 1, wherein the first conductive layer is in contact with a first side wall of the battery can and a first side portion of the electrode assembly; and wherein the second conductive layer is in contact with a second side wall of the battery can and a second side portion of the electrode assembly.

6. The method of making a battery cell as recited in claim 1, wherein at least one of the first filling hole and the second filing hole is disposed in the top cap assembly.

7. The method of making a battery cell as recited in claim 1, wherein at least one of the first filling hole and the second filling hole is disposed in the battery can.

8. The method of making a battery cell as recited in claim 1, further including pre-warming the battery can prior to disposing at least one of the first portion of the liquid solution and/or the second portion of the liquid solution within the battery cell.

9. The method of making a battery cell as recited in claim 1, wherein filling the battery cell with the liquid electrolyte includes vacuum filling.

10. A method for making a battery cell comprising:
disposing an electrode assembly within a battery can;
assembling a top cap assembly to the battery can to form a battery cell having two filling holes;
disposing a liquid solution within the battery cell via at least one of the two filling holes, the liquid solution including an organic solvent, a cross-linkable polymer and a cross-linking agent;
converting the liquid solution into at least one conductive layer disposed between at least one side portion of the electrode assembly and the battery can, wherein converting the liquid solution into the at least one conductive layer includes reacting the cross-linkable polymer and the cross-linking agent of the liquid solution to form a reaction product, wherein the organic solvent is contained within the reaction product; and
filling the battery cell with a liquid electrolyte using vacuum filling.

11. The method of making a battery cell as recited in claim 10, wherein disposing the liquid solution within the battery cell further includes: disposing a first portion of the liquid solution within the battery cell via one of the two filling holes; and disposing a second portion of the liquid solution within the battery cell via another of the two filling holes.

12. The method of making a battery cell as recited in claim 11, further including: rotating the battery cell from a first position to a second position before disposing the second portion of the liquid solution within the battery cell.

13. The method of making a battery cell as recited in claim 12, further including storing the battery cell for a pre-defined period of time in the first position before rotating the battery cell to the second position.

14. The method of making a battery cell as recited in claim 13, further including storing the battery cell in the second position after rotating the battery cell from the first position into the second position.

15. The method of making a battery cell as recited in claim 12, wherein the at least one conductive layer includes two conductive layers, the first portion of the liquid solution is converted into one of the two conductive layers when the battery cell is in the first position, and the second portion of liquid solution is converted into another of the two conductive layers when the battery cell is in the second position.

16. The method of making a battery cell as recited in claim 15, wherein one of the two conductive layers is disposed between the battery can and at one side portion of the electrode assembly, and another of the two conducive layers is disposed between the battery can and another side portion of the electrode assembly.

17. The method of making a battery cell as recited in claim 16, wherein one of two conductive layers is in contact with the battery can and one side portion of the electrode assembly, and another of the two conductive layers is in contact with the battery can and another side portion of the electrode assembly.

18. The method of making a battery cell as recited in claim 10, wherein the organic solvent of the liquid solution includes one of an alkyl phosphate or a fluorinated alkyl phosphate, and reacting the cross-linkable polymer and the cross-linking agent of the liquid solution to form the reaction product includes applying heat to the battery cell.

19. The method of making a battery cell as recited in claim 10, further including pre-warming the battery can prior to disposing the liquid solution within the battery cell.

* * * * *